April 5, 1966 G. I. HIPPLE, JR 3,244,130
METHOD OF MAKING A POLYGONAL EXPANSION JOINT
Original Filed June 23, 1961 3 Sheets-Sheet 1
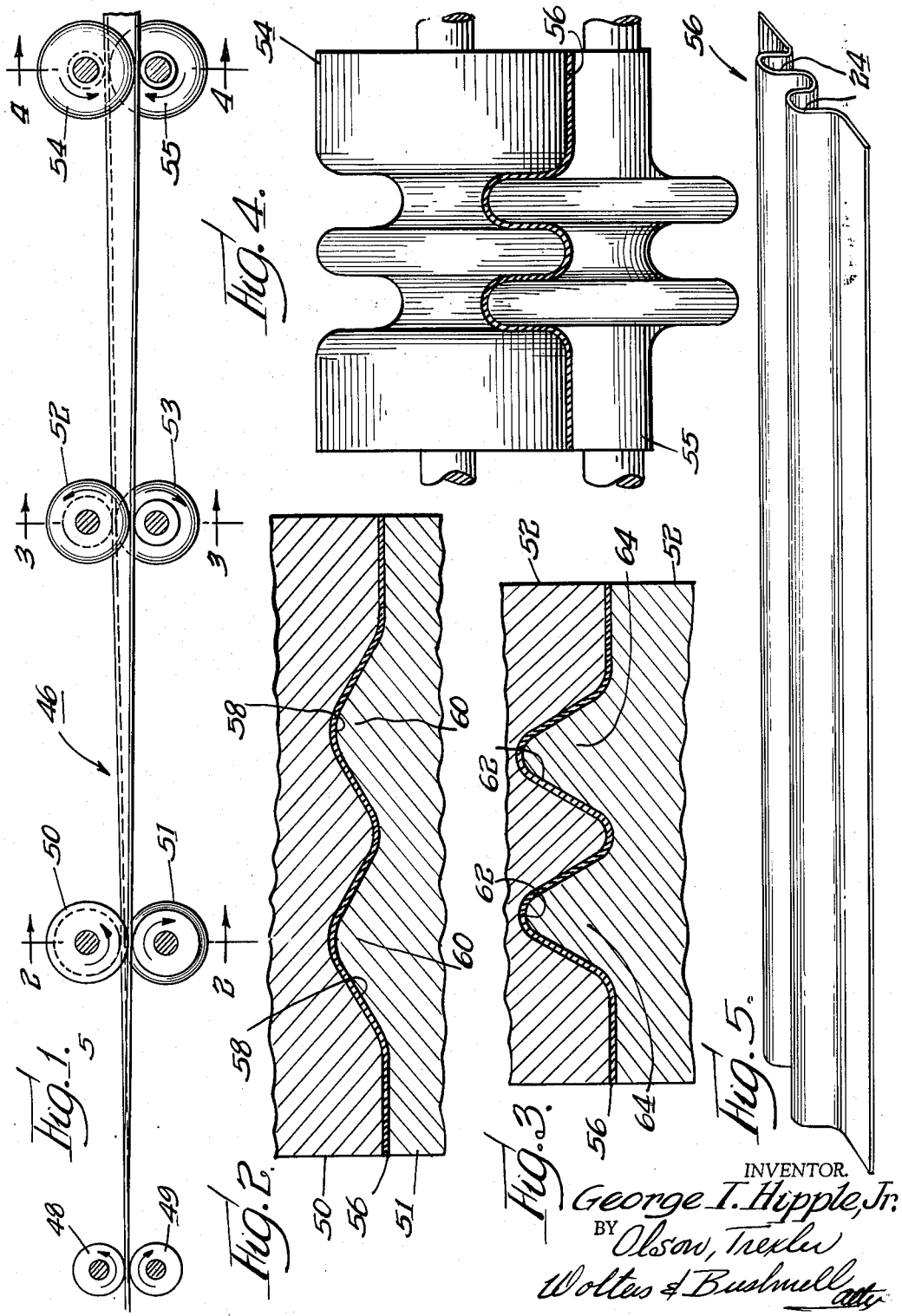
INVENTOR.
George I. Hipple, Jr.
BY Olson, Trexler
Wolters & Bushnell April 5, 1966  G. I. HIPPLE, JR  3,244,130
METHOD OF MAKING A POLYGONAL EXPANSION JOINT
Original Filed June 23, 1961  3 Sheets-Sheet 2
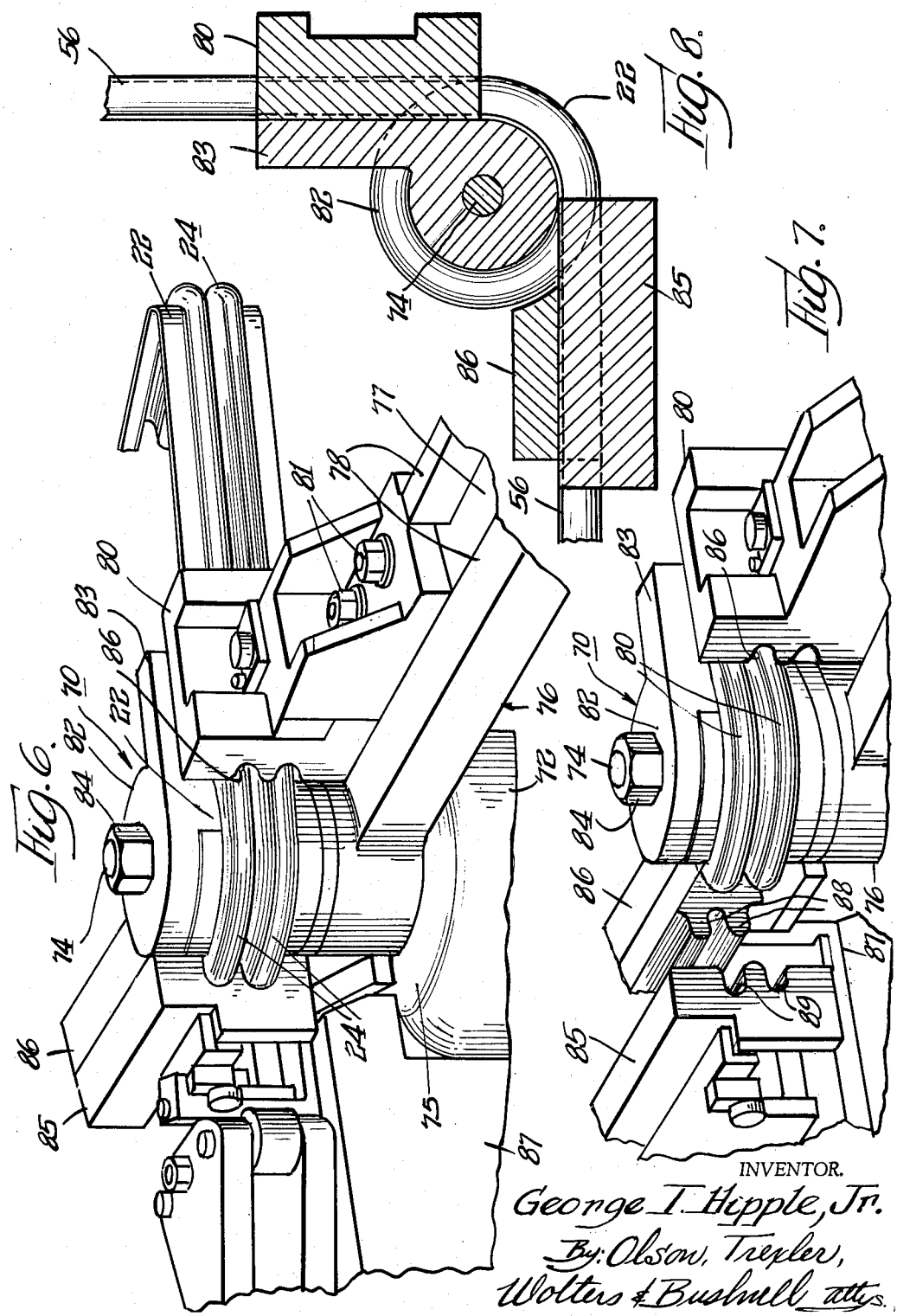
INVENTOR.
George T. Hipple, Jr.
By: Olson, Trexler,
Wolters & Bushnell attys.

April 5, 1966  G. I. HIPPLE, JR  3,244,130
METHOD OF MAKING A POLYGONAL EXPANSION JOINT
Original Filed June 23, 1961  3 Sheets-Sheet 3
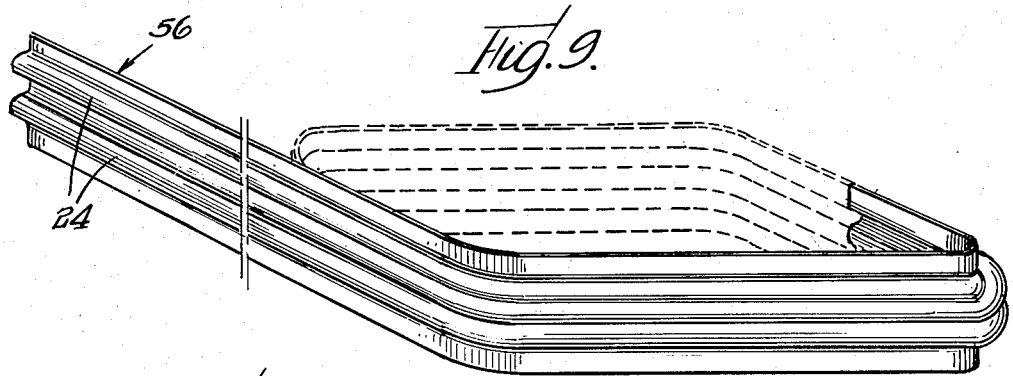
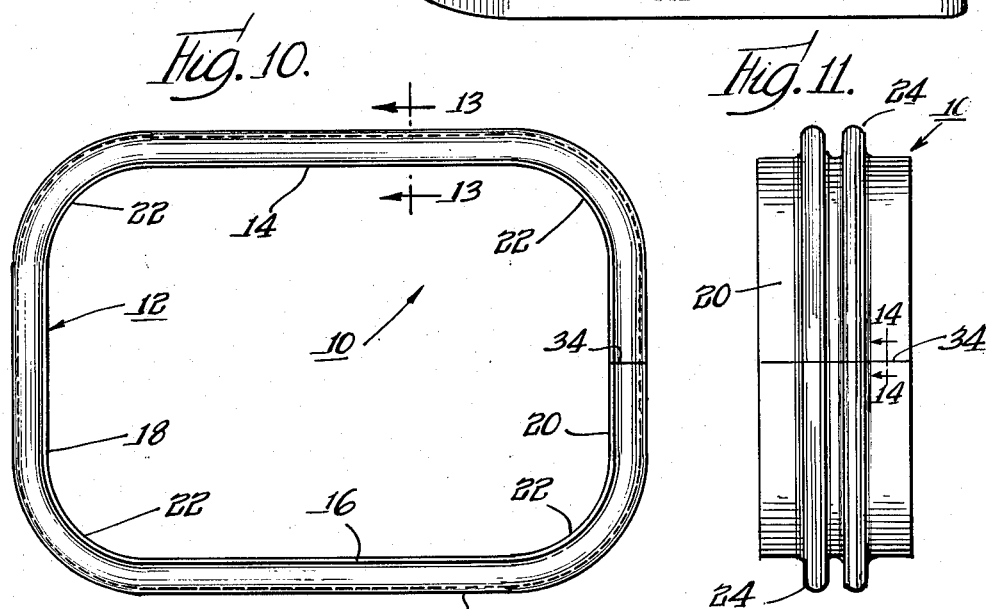
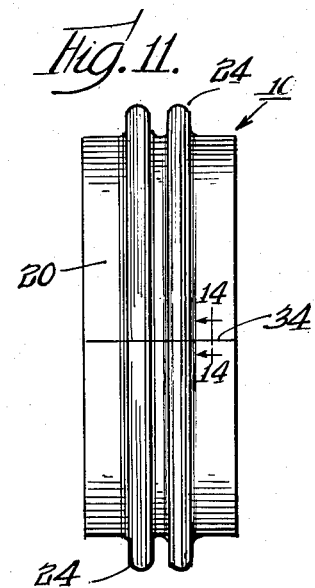
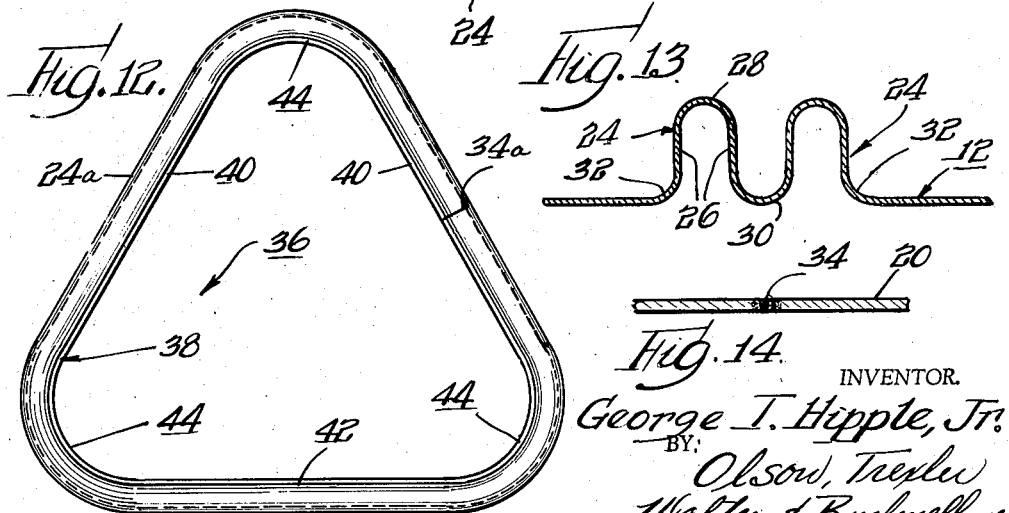
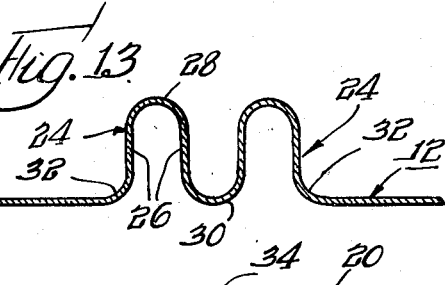
INVENTOR.
George T. Hipple, Jr.
BY: Olson, Trexler
Wolters & Bushnell attys.

United States Patent Office 3,244,130
Patented Apr. 5, 1966

3,244,130
METHOD OF MAKING A POLYGONAL EXPANSION JOINT
George I. Hipple, Jr., Elgin, Ill., assignor to Calumet & Hecla, Inc., Evanston, Ill., a corporation of Michigan
Original application June 23, 1961, Ser. No. 119,120. Divided and this application Jan. 18, 1965, Ser. No. 426,041
5 Claims. (Cl. 113—116)

This application is a division of my copending application Serial No. 119,120 filed June 23, 1961, now abandoned.

This invention relates to axially and laterally movable expansion joints and particularly pertains to large size expansion joints of polygonal cross section and to an improved method of making such expansion joints.

Ordinarily, tubular expansion joints are relatively small in cross section, generally falling in the range extending from about six inches to about forty-eight inches in diameter. Toward the upper region of this size range and therebeyond to a size of about 120 inches in cross sectional width, it is frequently necessary or desirable than an expansion joint tubing be polygonal rather than round in cross section. Specifically, an expansion joint having a rectangular or square cross section may better utilize the work space of a particular installation and additionally will provide a larger area of internal cross section than would a round cross sectional joint of the same width.

In polygonally shaped expansion joints having corrugated side walls, great difficulty has been encountered in economically forming the corner portions in the corrugated walls. Prior solutions to this forming problem entailed first folding or corrugating four separate sheets of material and then soldering or welding the sheets together at their edges to form a box-like structure. This type of construction required painstaking fitting together of the corrugated sheets and produced difficult welding problems. Because the welding was all at the corners, welding stresses were induced into these regions which were already highly stressed in the ordinary use of the expansion joint. Cracks in the welded seams were often found to result from such intense concentration of stresses and effected a generally unsatisfactory expansion joint structure. Still further, a substantial footage of precision hand welding was required in the fabrication of expansion joint of the foregoing type having only a moderate size.

In view of the foregoing, it is an important object of this invention to provide an improved method of forming an expansion joint having a relatively large polygonal cross section which entails only a modicum of hand welding operations.

Another object of the invention is to provide an improved expansion joint of polygonal cross section having smoothly curved corner portions having no welded seams thereon.

Still another object of this invention is to provide an improved method of forming an expansion joint having a rectangular cross section from a flat, longitudinally extending metal sheet.

Yet another object of this invention is to provide an improved method of forming a relatively large size expansion joint of rectangular cross section, which method requires only a minimum of machine or hand operations in its execution.

A further object of this invention is to provide an improved expansion joint of the type described which is simple in design and construction, economical to manufacture, and which is adapted to provide a predetermined flexibility in fluid conduits.

Further features of this invention pertain to the particular arrangement of the steps of the method and the elements of the expansion joint whereby the above outlined and additional operating features thereof are attained.

The invention, both as to its organization and method of operation, together with further objects and advantages thereof, will best be understood by reference to the following specification taken in connection with the accompanying drawings wherein like reference numerals designate like parts throughout, in which:

FIGURE 1 is an elevational view diagrammatically illustrating the roll forming apparatus employed in one step of the method of the present invention, the forming apparatus being shown with a work piece of flat sheet material;

FIG. 2 is a greatly enlarged vertical sectional view taken generally in the directions of the arrows along the line 2—2 in FIG. 1;

FIG. 3 is a view similar to FIG. 2 taken generally in the directions of the arrows along the line 3—3 in FIG. 1;

FIG. 4 is an enlarged, vertical sectional view taken in the direction of the arrows along the line 4—4 in FIG. 1, certain parts being shown in elevation for purposes of clarity;

FIG. 5 is a perspective view of the sheet material subsequent to the initial forming operation of the present invention;

FIG. 6 is a fragmentary perspective view of the stretching and bending apparatus employed in an intermediate step of the method of the present invention, the bending apparatus being shown in operative association with the partially formed sheet of material;

FIG. 7 is a fragmentary, perspective view similar to FIG. 6 showing the clamping dies of the bending apparatus in their non-clamping positions;

FIG. 8 is a horizontal sectional view of the apparatus and sheet material shown in FIG. 6;

FIG. 9 is a fragmentary, perspective view showing the expansion joint of the present invention at an intermediate stage of its fabrication, and depicting in broken lines the completed form of the expansion joint;

FIG. 10 is a plan view of an expansion joint made in accordance with and embodying the principles of the present invention;

FIG. 11 is an end view of the expansion joint structure shown in FIG. 10;

FIG. 12 is a plan view of a second form of expansion joint made in accordance with and embodying the principles of the present invention;

FIG. 13 is an enlarged sectional view taken generally in the directions of the arrows along the line 13—13 in FIG. 10; and FIG. 14 is an enlarged sectional view of the closing weld seam of the expansion joint taken generally in the direction of the arrows along the line 14—14 in FIG. 11.

Referring now to FIGS. 10, 11 and 13 of the drawings where there is illustrated an expansion joint generally designated 10 made in accordance with and embodying the features of the present invention. The expansion joint 10 essentially comprises a continuous wall structure 12 having a generally rectangular outline defined by a spaced pair of first straight sections 14 and 16 disposed at a right angle to a spaced pair of second straight sections 18 and 20, a smoothly curved corner section 22 integrally joining together each of the first straight sections to each of the second straight sections.

As shown in FIG. 13 in cross section, the wall structure 12 is corrugated there being a pair of convolutions 24 shown protruding outwardly therefrom. Each convolution 24 includes side walls 26 disposed at a right angle to the general plane of the wall structure 12 and a semi-circular crest 28 integrally joined to each of the walls 26 at the outermost ends thereof. A semi-circular root portion 30 smoothly merges into the walls 26 at the innermost ends thereof and a quarter round fillet portion 32 joins the pair of convolutions 24 to the uncorrugated portion of the wall structure 12 thereby to afford a measure of spring-like axial and lateral flexibility to the wall structure 12 of the joint 10.

Inasmuch as the wall structure 12 is continuous and has a periphery of 360°, it is a feature of this invention that there be as few welded seams as practicable in the joint 10, and it is further contemplated that in an expansion joint having a wall periphery of about 20 feet there is required only one welded joint. More particularly referring to FIGS. 10, 11, and 14, a seam or joint 34 is shown in the straight side 20 intermediate a pair of corners 22, the joint 34 being preferably of the butt welded type which may be made by conventional methods such as heliarc in the case of stainless steel materials or silver soldered or otherwise fused in the manner well known in the art of various other materials of construction.

There is shown in FIG. 12 a second form of expansion joint designated generally by the numeral 36 and made in accordance with and embodying the features of the present invention. The expansion joint 36 essentially comprises a contiguous wall structure 38 having a generally triangular outline defined by a converging pair of straight sections 40 angularly disposed with respect to a straight base section 42, smoothly curved corner sections 44 integrally joining together the straight sections 40 and 42.

The wall structure 38 of the expansion joint 36 includes convolutions similar to the convolutions 24 as previously described and hence, herein designated 24a. Similarly, the expansion joint 36 includes a butt welded seam herein designated 34a, and which is similar in every respect to the seam 34 previously described.

A complete description of two embodiments of the article of the present invention being set forth above, a detailed disclosure of the method of their fabrication will now be unfolded. In FIGS. 1 through 4, a roll forming machine generally designated 46 is shown diagrammatically and includes four complementary pairs of rolling dies or spindles numbered from left to right, 48–49, 50–51, 52–53, and 54–55. Of course, it is to be appreciated that the roll forming machine 46 may include fewer than four pairs of spindles or a greater number such as twenty pairs, four pairs being shown herein as exemplary arrangement. Drive means are provided (not shown) to rotate the upper spindles 40 of the complementary pairs in a counterclockwise direction and to rotate the lower spindles in the pairs in a clockwise direction. The first pair of rollers 48–49 function as guides to urge a flat, elongated sheet of material 56 toward the right and thereby through the other pairs of spindles in the roll forming machine 46. It is perceived that the flat elongated sheet 46 at the completion of the fabricating operation will become the continuous wall structure 12 or 38 for the expansion joints 10 or 36 respectively.

Referring to FIG. 2, the second pair of spindles 50–51 receives the sheet 56 between the working surfaces thereof, the upper spindle 50 being provided with a spaced pair of cavities 58 receiving therein a spaced pair of protruding rings 60 of the lower spindle 51. The third pair of spindles 52–53, shown best in FIG. 3, is adapted to receive the sheet 56 from the second pair of spindles 50–51 and to perform a further forming operation thereon. Specifically, the upper rotatable spindle 52 is provided with a spaced pair of cavities 52 on the working surface thereof adapted to cooperate with a complementary pair of protruding rings 64 on the lower rotatable spindle 53. It is to be appreciated that the cavities 62 and protruding portions 64 have a greater depth than the cavities 58 and protruding portions 60 on the second pair of spindles 50 and 51 respectively thereby to further form the convolutions 24 in the sheet material 56.

The fourth or finishing spindles 54–55 are adapted to receive between the complementary mating surfaces thereof the sheet 56 from the third pair of rotatable spindles 52–53. The rotatable finishing spindles 54–55, shown in FIG. 4 in elevation for purposes of clarity, have a similar but deeper pair of cavities and ring portions to those provided on the aforementioned second and third pairs of spindles, the working portions of the finishing spindles 54–55 further forming the sheet 56 into its final configuration as shown in FIG. 5.

Recapitulating, the flat, elongated sheet of material 56 is first received between the guide spindles 48–49 and urged thereby toward and between the intermediate or second pair of forming spindles 50–51, thereafter into the third pair of spindles 52–53, and finally through the fourth or finishing spindles 54–55, issuing therefrom in a flat sheet having upwardly protruding corrugations 24 (previously described) disposed thereon.

There is shown in FIGS. 6–8 a machine generally designated by the numeral 70 used for stretching and bending portions of the material 56 to form the smoothly curved corner sections 22. The machine 70 may be of the type manufactured by the Pines Engineering Co., Inc., of Aurora, Illinois, and is known in the metal forming industry by the name "Pines Bender."

The bender machine 70 essentially comprises a massive, stationary base 72 having a vertically disposed shaft 74 securely mounted thereon. A swinging arm 76 is pivotally mounted at its enlarged inner end of the shaft 74 adjacent to a top flat surface 75 of the base 72 which functions as a horizontal bearing surface for the arm 76 when it is pivoted about the shaft 74. Extending away from the shaft 74, the swinging arm 76 includes a bed 77 having guide means or ways 78 thereon for holding in alignment a first slidable die or clamping member 80 securely in a fixed position on the bed 77 of the arm 76. When a pair of fasteners 81 are loosened, the first die or clamping member 80 is slidable along the ways 78 towards or away from the shaft 74.

A bending form or mandrel 82, shown clearly in FIG. 7, is pivotally mounted on the shaft 74 arranged above the enlarged inner end of the swinging arm 76. The mandrel 82 is generally circular in configuration with a tangent clamping projection 83 extending outwardly from the circular portion thereof. The mandrel 82 is removably secured to the shaft 74 by a large nut 84, and other means (not shown) are provided to interlock the mandrel 82 and the arm 76 whereby the parts 82 and 76 pivot as a unit about the shaft 74.

Wiper die members 85 and 86 are provided on the bender machine 70 arranged generally tangentially to the mandrel 82. A sub-frame 87 provided on the base 72 includes guide means or ways (not shown) for holding the slidable and clamping wiper die 85 securely in its operative position with respect to the stationary wiper die 86. Provisions are made in the machine 70 so as to render the slidable or clamping wiper die 84 selectively movable with respect to the stationary die 86.

Means complementary in shape to the convolutions 24 of the sheet 56 are included upon the dies 80, the bending mandrel 82, and the wiper dies 85 and 86, so as to receive the sheet 56 in the bender 70 for effecting the stretching and bending operations. Specifically, the mandrel 82 and the stationary wiper die 86 are provided with a spaced pair of male die projections 88 for engaging the inside of the spaced pair of convolutions 24 of the sheet 56. The slidable die members 80 and 85 are provided with a spaced pair of cavities complementary in size and shape to the outer portions of the convolutions 24 for receiving the convolutions 24 therein when the sheet 56 is disposed in the bender machine 70.

As operated for the purposes of this invention, the bender machine 70 is first prepared to receive the straight sheet 56. This is effected by pivoting the swinging arm 17 and the mandrel 82 about the shaft 74 in a clockwise direction as viewed in FIGS. 6–8. The parts 76 and 82 are pivoted until the tangent clamping projection 83 is in alignment with the stationary wiper die 86 and the die projections 88 on the respective parts are also in alignment. Next, the slidable members 80, 85 are moved into a position away from the members 83 and 86 respectively thereby affording a space for receiving the straight sheet of material 56.

When the sheet 56 has been place in the space between the respecively cooperating die members 85, 86, and 80, 83, the slidable clamping or die members 85 and 80 are moved into engagement with the sheet 56 and are fixedly clamped into their respective operative positions. In this condition, the sheet 56 having convolutions 24 formed therein is securely held in the bender machine 70 between two spaced apart points, the points being defined by the die members 85, 86 and 80, 83 respectively. Next, the swinging arm 76 and mandrel 82 are caused to rotate by power means (not shown) in a counterclockwise direction as viewed in FIGS. 6–8, through an angle of 90° in the case of a rectagular shaped expansion joint 10 thereby forming a corner portion 22. In this operation, the sheet 56 held between the dies on the bender 70 is bent as well as stretched to form the smooth corner portion 22. In the case of the triangular cross sectional expansion joint 36, the angle of rotation of the swinging arm is adjusted accordingly to describe an arc of 120°.

Upon disengaging the clamping members 80, 85 in the bender machine 70, the sheet 56 having a corner 22 newly formed therein is repositioned in the bender machine 70 to form the remaining corners 22 required for the particular expansion joint being fabricated.

When the corrugated sheet 56 has been formed into a figure having a periphery of 360° as shown in dotted lines in FIG. 9, the free end portions of the sheet are brought together so as to register the convolutions 24 on the opposite ends and to provide a smooth joint. An alignment fixture (not shown) may be employed to facilitate such alignment of the free ends and to hold the end portions in proper position during the welding operation to be described below.

After the free ends of the sheet 56, now formed into the shape of an expansion joint, are positioned in an abutting relationship, the abutting edges are fused together to form the joint 34 by the heliarc or shielded arc welding process. The joint 34 may also be formed by resistance welding, soldering, brazing or other means well known in the art. Depending upon the design of the joint 34, filler metal may or may not be required to enhance the integrity of the bond between the abutting edges. It has been found beneficial that the joint 34 be smooth and substantially flush with the adjacent parent metal.

From the foregoing it is apparent that there has been provided an improved polygonal expansion joint having smoothly curved corners and only a minimum of hand welded seams, i.e., usually one. The number of welded seams 34 may be increased to more than one where a joint has a peripheral length of greater than 20 feet. This obtains since the problem of handling two lengths of corrugated material is more easily solved than would be the case of a single, long sheet of material.

The various fabricating operations incorporated in the method of the invention and described herein are noncomplex in character and may be expeditiously carried out by workmen having no great degree of expertness in metal forming operations. It is to be appreciated that prior art expansion joints frequently require a highly skilled artisan to make the expansion joint structure, but in this invention such skilled workmanship is reduced to a minimum.

While there has been described what is at present considered to be the preferred embodiments of the invention, it will be understood that various modifications may be made therein, and it is intended to cover in the appended claims all such modifications as fall within the true spirit and scope of the invention.

The invention is hereby claimed as follows:

1. The method of forming from a flat, longitudinally extending, metal sheet an expansion joint having corrugated sidewalls including both linear and curved portions, comprising the steps of: forming a plurality of longitudinally extending, parallel disposed corrugations in a flat sheet of metal; supporting the opposite faces of the corrugated sheet with matably engaging members disposed at a pair of longitudinally spaced locations which define points situated closely adjacent a region which is to form a bend; clamping the corrugated metal sheet at said points; simultaneously stretching and laterally bending the sheet between the clamped points to form one of the curved portions; bringing into register the opposite lateral free edges of the corrugated portions; and joining together the oppositely lateral edges of the metal sheet.

2. The method according to claim 1 wherein said bending is caused to take place through an angle of ninety degrees.

3. The method according to claim 1 wherein said joining is produced by forming a fusion joint.

4. The method according to claim 1 wherein the forming of the corrugations is multi-stage, progressive forming.

5. The method according to claim 1 wherein said corrugated sheet is additionally supported at the radially inward face of the region where the bend is to be formed.

References Cited by the Examiner

UNITED STATES PATENTS

| 2,077,454 | 4/1937 | Almdale | 138—171 |
|---|---|---|---|
| 2,143,442 | 1/1939 | Kellogg | 72—166 |
| 2,321,637 | 6/1943 | Watts | 72—166 |
| 2,685,305 | 8/1954 | Woods | 148—121 |

FOREIGN PATENTS

| 482,769 | 4/1938 | Great Britain. |
|---|---|---|

CHARLES W. LANHAM, *Primary Examiner.*

R. J. HERBST, *Examiner.*